(12) United States Patent
Ryu et al.

(10) Patent No.: US 10,386,468 B2
(45) Date of Patent: Aug. 20, 2019

(54) PHOTOGRAPHING APPARATUS AND METHOD

(71) Applicant: Hanwha Techwin Co., Ltd., Seongnam-si (KR)

(72) Inventors: Yeongeol Ryu, Changwon-si (KR); Youngmin Baek, Changwon-si (KR)

(73) Assignee: HANWHA TECHWIN CO., LTD., Changwon-si (KR)

( * ) Notice: Subject to any disclaimer, the term of this patent is extended or adjusted under 35 U.S.C. 154(b) by 809 days.

(21) Appl. No.: 14/831,104

(22) Filed: Aug. 20, 2015

(65) Prior Publication Data

US 2016/0261854 A1  Sep. 8, 2016

(30) Foreign Application Priority Data

Mar. 5, 2015  (KR) .................. 10-2015-0031115

(51) Int. Cl.
| | | |
|---|---|---|
| *G01S 7/486* | (2006.01) | |
| *G02B 13/06* | (2006.01) | |
| *H04N 5/225* | (2006.01) | |
| *H04N 5/33* | (2006.01) | |
| *H04N 13/232* | (2018.01) | |
| *H04N 13/254* | (2018.01) | |
| *H04N 13/257* | (2018.01) | |
| *H04N 13/271* | (2018.01) | |
| *G01S 17/08* | (2006.01) | |

(52) U.S. Cl.
CPC ............ *G01S 7/4865* (2013.01); *G02B 13/06* (2013.01); *H04N 5/2256* (2013.01); *H04N 5/332* (2013.01); *H04N 13/232* (2018.05); *H04N 13/254* (2018.05); *H04N 13/257* (2018.05); *H04N 13/271* (2018.05); *G01S 17/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,420,689 | A * | 5/1995 | Siu ........................ | G01N 21/956 356/394 |
| 6,621,516 | B1 * | 9/2003 | Wasson .................. | H04N 7/185 348/36 |
| 7,686,462 | B2 * | 3/2010 | Jones ..................... | H01J 29/896 359/601 |
| 8,259,305 | B2 | 9/2012 | Lee et al. | |
| 8,467,857 | B2 | 6/2013 | Kim et al. | |
| 8,687,044 | B2 | 4/2014 | Katz et al. | |

(Continued)

FOREIGN PATENT DOCUMENTS

| | | | | |
|---|---|---|---|---|
| DE | 102013007961 A1 * | 11/2014 | ............. | G01S 17/89 |
| KR | 10-0378490 B1 | 3/2003 | | |
| KR | 10-0939537 B1 | 2/2010 | | |

*Primary Examiner* — Tyler W. Sullivan
(74) *Attorney, Agent, or Firm* — Ladas & Parry LLP (57) ABSTRACT

Provided is a photographing apparatus and photographing method. The photographing apparatus includes a fish eye lens; a plurality of light emitters disposed around the fish eye lens and configured to emit light at different angles with respect to an optical axis of the fish eye lens; and an image sensor configured to receive the light emitted from the plurality of light emitters and reflected by at least one object, and convert the light into an electric signal including depth information about the object.

20 Claims, 8 Drawing Sheets

(56) References Cited

U.S. PATENT DOCUMENTS

| | | | | |
|---|---|---|---|---|
| 2002/0176605 | A1* | 11/2002 | Stafsudd | G06K 9/3241 382/106 |
| 2007/0188653 | A1* | 8/2007 | Pollock | G01C 11/02 348/373 |
| 2008/0068601 | A1* | 3/2008 | Thayer | G01B 11/24 356/241.3 |
| 2009/0296390 | A1* | 12/2009 | Dubord | B60Q 1/24 362/240 |
| 2010/0295481 | A1* | 11/2010 | Van Endert | H03K 17/96 315/312 |
| 2012/0257042 | A1* | 10/2012 | McKaigue | G01N 21/954 348/84 |
| 2012/0263447 | A1* | 10/2012 | Fransson | G03B 15/03 396/164 |
| 2013/0083184 | A1* | 4/2013 | Yogesan | A61B 3/0033 348/78 |
| 2013/0188834 | A1* | 7/2013 | Ebisawa | A61B 3/113 382/103 |
| 2015/0177382 | A1* | 6/2015 | Vogel | G01S 17/08 250/203.2 |
| 2015/0253428 | A1* | 9/2015 | Holz | G01S 17/42 356/5.01 |
| 2015/0374210 | A1* | 12/2015 | Durr | A61B 1/041 600/111 |
| 2016/0328854 | A1* | 11/2016 | Kimura | G01C 3/08 |

\* cited by examiner

PHOTOGRAPHING APPARATUS AND METHOD

CROSS-REFERENCE TO THE RELATED APPLICATION

This application claims priority from Korean Patent Application No. 10-2015-0031115, filed on Mar. 5, 2015, in the Korean Intellectual Property Office, the disclosure of which is incorporated herein in its entirety by reference.

BACKGROUND

1. Field

Apparatuses and methods consistent with exemplary embodiments relate to a photographing apparatus and method, and more particularly, to a photographing apparatus and method by which depth information about an object may be acquired throughout a wide area at one time.

2. Description of the Related Art

Methods of measuring a distance to an object by using light have been widely used. The methods of measuring a distance by using light may be classified as a triangulation method, a time of flight (TOF) method, and a method using a phase-shift.

The triangulation method is a method of measuring a distance by using triangulation, and the TOF method is a method of calculating a distance by using a difference between a time of emitting light from a distance measuring apparatus and a time of receiving the light reflected from an object to the distance measuring apparatus. The method of using the phase-shift is a method of calculating a distance by using a phase difference between reference light and light reflected from an object after transmitting the light having a predetermined frequency to the object.

Recently, research into a photographing apparatus measuring a three-dimensional (3D) shape of an object by using the above distance measuring method has been conducted.

However, the photographing apparatus according to the related art may only measure a 3D image of an object that is present within a narrow area at one time.

SUMMARY

One or more exemplary embodiments of the inventive concept provide a photographing apparatus and method capable of measuring and obtaining a three-dimensional (3D) shape of an object throughout a wide area at once.

Various aspects of the inventive concept will be set forth in part in the description which follows and, in part, will be apparent from the description, or may be learned by practice of the presented embodiments.

According to one or more embodiments, there is provided a photographing apparatus which may include: a fish eye lens; a plurality of light emitters disposed around the fish eye lens and configured to emit light at different angles with respect to an optical axis of the fish eye lens; and an image sensor configured to receive the light emitted from the plurality of light emitters and reflected by at least one object, and convert the light into an electric signal.

The plurality of light emitters may be disposed around the fish eye lens such that the farther a light emitter is disposed from a center of the fish eye lens, the greater is an angle between the optical axis of the fish eye lens and a direction in which the light is emitted from the light emitter.

The photographing apparatus may further include a housing supporting the fish eye lens, wherein the plurality of light emitters may be arranged on a radial surface of the housing.

The image sensor may be disposed in the housing.

The fish eye lens may have a field of view (FOV) of 180° or greater.

The plurality of light emitters may emit infrared light.

The plurality of light emitters may include a plurality of first light emitters and a plurality of second light emitters, and the first light emitters may be configured to simultaneously emit first light at a first time point, and the second light emitters may be configured to simultaneously emit second light at a second time point which is different from the first time point.

The first and second light emitters may be disposed such that the first light emitted from one of the first light emitters does not overlap the first light emitted from an adjacent one of the first light emitters within a predetermined distance from the one of the first light emitters toward an object to which the first light is transmitted. Further, the first and second light emitters may be disposed such that the first light emitted from the one of the first light emitters has a region overlapping the second light emitted from one of the second light emitters which is adjacent to the one of the first light emitters, within the predetermined distance.

The photographing apparatus may further include at least one shield disposed between the plurality of light emitters and configured to prevent overlapping between the light emitted from at least one of the plurality of light emitters disposed at one side of the shield and the light emitted from another at least one of the plurality of light emitters disposed at the other side of the shield.

According to one or more embodiments, there is provided a photographing method which may include: controlling a plurality of light emitters to emit light at different angles from one another with respect to an optical axis of a fish eye lens disposed inside the plurality of light emitters; converting the light that has been emitted from the plurality of light emitters, reflected by at least one object, and has passed through the fish eye lens, into an electric signal by using an image sensor; calculating distances to the object from the plurality of light emitters based on the electric signal; and generating a three-dimensional (3D) image of the object based on the distances to the object.

The plurality of light emitters may be disposed around the fish eye lens such that the farther a light emitter is disposed from a center of the fish eye lens, the greater is an angle between the optical axis of the fish eye lens and a direction in which the light is emitted from the light emitter.

The fish eye lens may have a field of view (FOV) of 180° or greater.

The plurality of light emitters may emit infrared light.

The plurality of light emitters may include a plurality of first light emitters and a plurality of second light emitters, and the controlling the plurality of light emitters to emit the light may include: controlling the first light emitters to simultaneously emit first light at a first time point; and controlling the second light emitters to simultaneously emit second light at a second time point which is different from the first time point.

The photographing method may further include extracting color information about the object from external visible light that is incident on the image sensor through the fish eye lens after being reflected from the object.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

While the inventive concept of the present application allows for various changes and numerous embodiments, exemplary embodiments will be illustrated in reference to the drawings and described in detail herebelow. However, this is not intended to limit the inventive concept to these embodiments, and it is to be appreciated that all changes, equivalents, and substitutes that do not depart from the spirit and technical of the inventive concept are encompassed in the inventive concept. In the following descriptions, certain detailed explanations about the related art are omitted when it is deemed that they may unnecessarily obscure the essence of the inventive concept.

Hereinafter, the inventive concept will be described in detail by explaining exemplary embodiments of the inventive concept with reference to the attached drawings. Like reference numerals in the drawings denote like elements.

While such terms as "first," "second," etc., may be used to describe various components, such components must not be limited to the above terms. The above terms are used only to distinguish one component from another.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Sizes of components in the drawings may be exaggerated for convenience of explanation. In other words, since sizes and thicknesses of components in the drawings are arbitrarily illustrated for convenience of explanation, the following exemplary embodiments are not limited thereto. As used herein, the term "and/or" includes any and all combinations of one or more of the associated listed items. Expressions such as "at least one of," when preceding a list of elements, modify the entire list of elements and do not modify the individual elements of the list.

Figure 1:
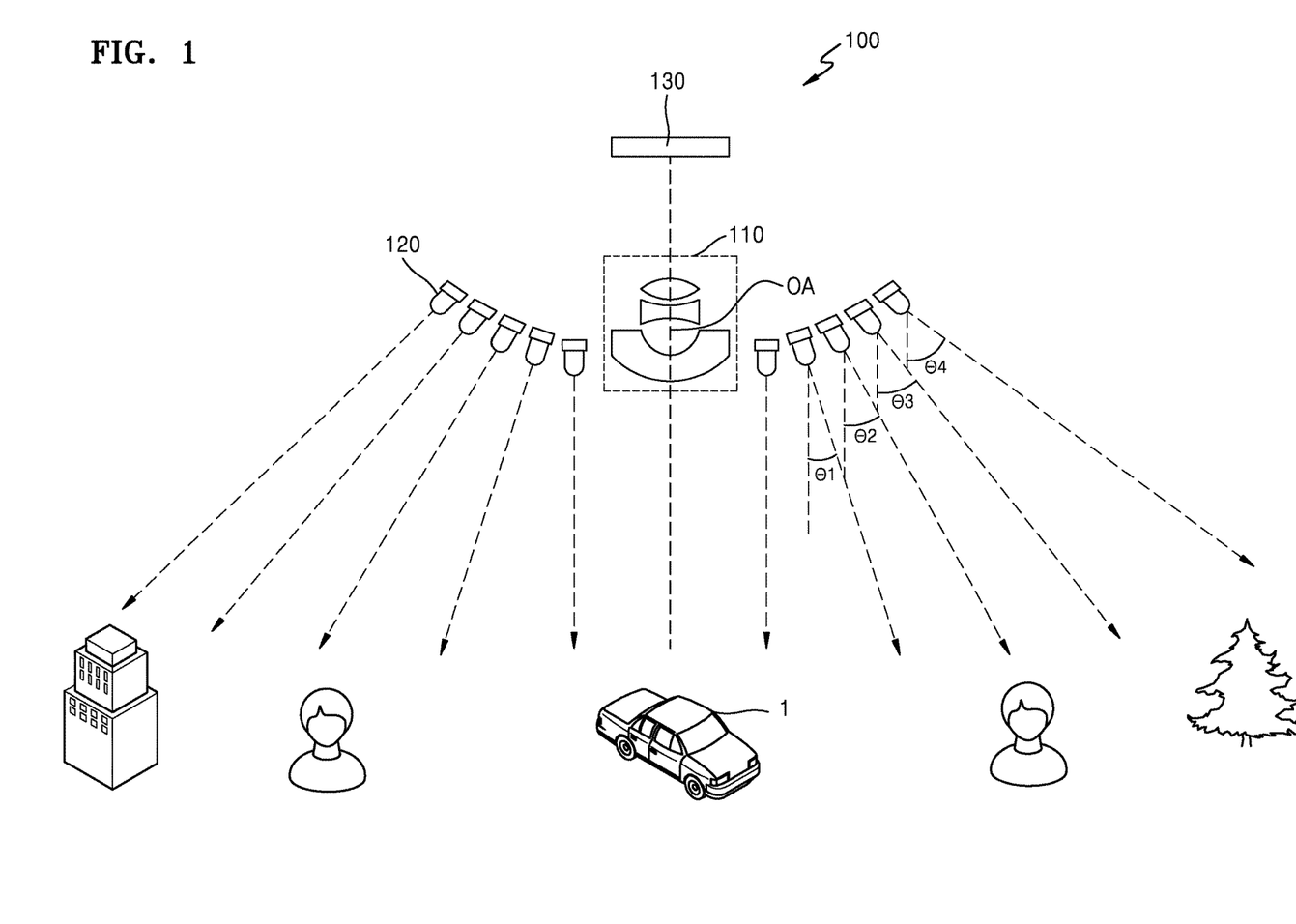
FIG. 1 is a schematic block diagram of a photographing apparatus, according to an exemplary embodiment.

FIG. 1 is a schematic block diagram of a photographing apparatus 100 according to an exemplary embodiment.

Referring to FIG. 1, the photographing apparatus 100 according to an exemplary embodiment includes a fish eye lens 110, a plurality of light emitters 120 arranged adjacent to the fish eye lens 110 to emit light at different angles from one another with respect to an optical axis OA of the fish eye lens 110, and an image sensor 130 receiving light that is emitted from the plurality of light emitters 120 and reflected by at least one object 1 and converting the light into electric signals.

The fish eye lens 110 may be an ultra-wide angle lens having a field of view (FOV) of 180° or greater, and may take a picture of a wide area at once due to the wide FOV. Light incident on an outer portion of the photographing apparatus 100 from an outside of the photographing apparatus 100 passes through the fish eye lens 110 and is incident on the image sensor 130, and the light received by the image sensor 130 is converted into an electric signal and may be generated as a two-dimensional (2D) image through signal processing. However, a three-dimensional (3D) image may not be obtained through only the fish eye lens 110.

According to an exemplary embodiment, the photographing apparatus 100 may include the plurality of light emitters 120 that are arranged to be adjacent to the fish eye lens 110 in order to obtain a 3D image. The light emitted from the light emitters 120 is reflected by the objects 1, and the light reflected from the object 1 passes through the fish eye lens 110 and is incident on the image sensor 130.

The plurality of light emitters 120 may emit light at different angles from one another with respect to the optical axis OA of the fish eye lens 110, in order to transmit the light to the object 1 existing within a range of the FOV of the fish eye lens 110. Here, the light emitted from the plurality of light emitters 120 may propagate in diverging directions in a form of light beams, and may be transmitted to the objects 1.

According to an exemplary embodiment, the plurality of light emitters 120 are sequentially arranged away from a center of the fish eye lens 110. In addition, the farther is a light emitter among the plurality of light emitters 120 disposed away from the center of the fish eye lens 110, the greater is an angle ($\theta1$, $\theta2$, $\theta3$ or $\theta4$) between the optical axis OA of the fish eye lens 110 and a direction in which light is emitted from the light emitter. The direction in which light is emitted from each of the light emitters 120 may be defined as a direction of a central line of the emission light.

The light emitted from the plurality of light emitters 120 is reflected by a plurality of different objects 1, and then, is incident on the image sensor 130. A distance from the photographing apparatus 100 to each of the objects 1 may be measured by a time of flight (TOF) method. The TOF method is a method of calculating a distance by measuring a time period from a time when the light is transmitted to an object 1 to a time when the light is received after being reflected from the object 1, and through the TOF method, depth information of the object 1, that is, a 3D image of the object 1, may be obtained.

In FIG. 1, the plurality of objects 1 may be different objects, but are not limited thereto, and the objects 1 may be a background, rather than certain objects. In addition, the objects 1 may correspond to different regions in the background or different regions of an object.

Each of the light emitters 120 may be a laser diode or a light-emitting diode (LED), and the light emitters 120 may emit a near-infrared ray, an intensity of which is modulated. According to an exemplary embodiment, a distance d to an object among the objects 1 may be expressed by following Equation 1, $$d = \frac{c}{f_{mod}} \cdot \frac{1}{2} \cdot \frac{\varnothing_d}{2\pi}, \qquad (1)$$

where c denotes a velocity of light, $f_{mod}$ denotes a modulated frequency, and $\phi_d$ denotes a phase shift between the light emitted from a light emitter among the light emitters 120 and the received light after being reflected.

That is, the light emitted from each of the plurality of light emitters 120 and reflected by the objects 1 is incident to the image sensor 130, and then, undergoes predetermined signal process to be generated as a 3D image.

According to an exemplary embodiment, the fish eye lens 110 has the FOV of 180° or greater, and thus, the fish eye lens 110 may receive the light reflected from the objects 1 that are arranged within a range of about 90° with respect to the optical axis OA. Therefore, the 3D images of the objects 1, that is, depth information of the objects 1, arranged throughout a wide area may be obtained at once.

Figure 2A:
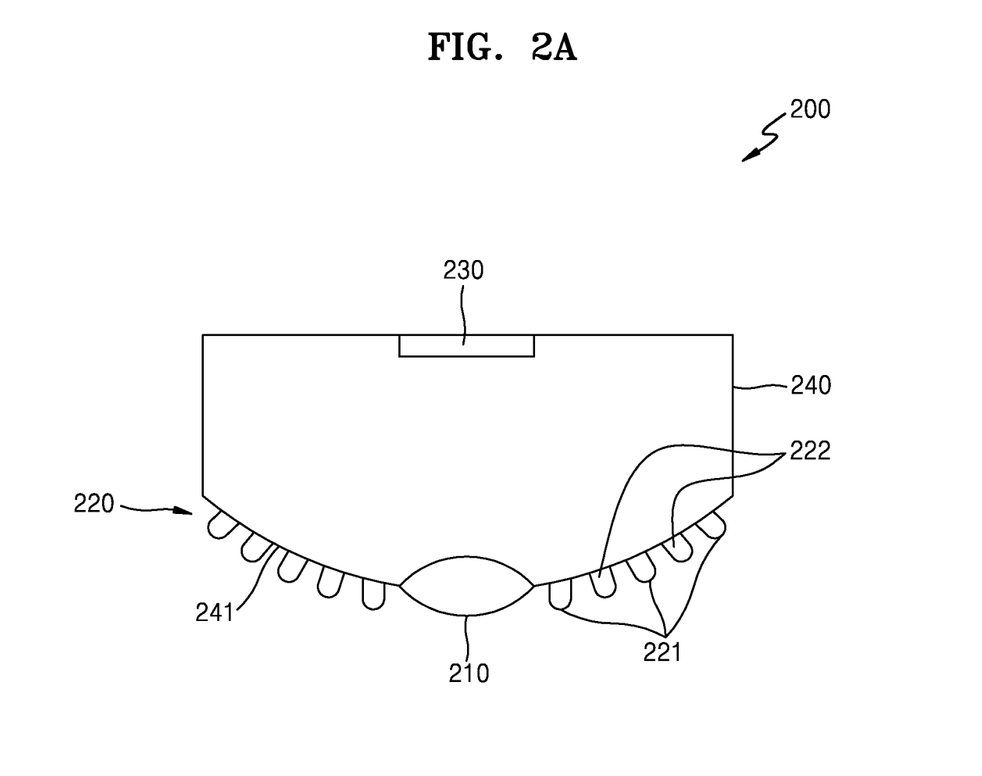
FIG. 2A is a schematic cross-sectional view of a photographing apparatus, according to an exemplary embodiment.
Figure 2B:
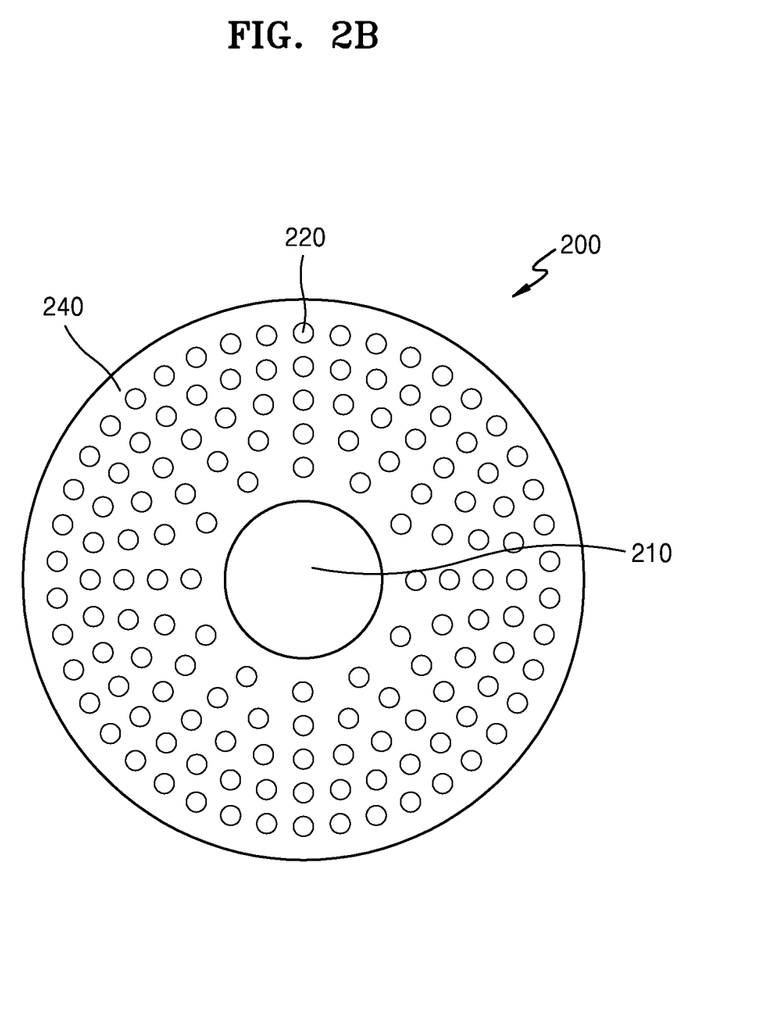
FIG. 2B is a schematic plan view of a photographing apparatus, according to an exemplary embodiment.
Figure 3A:
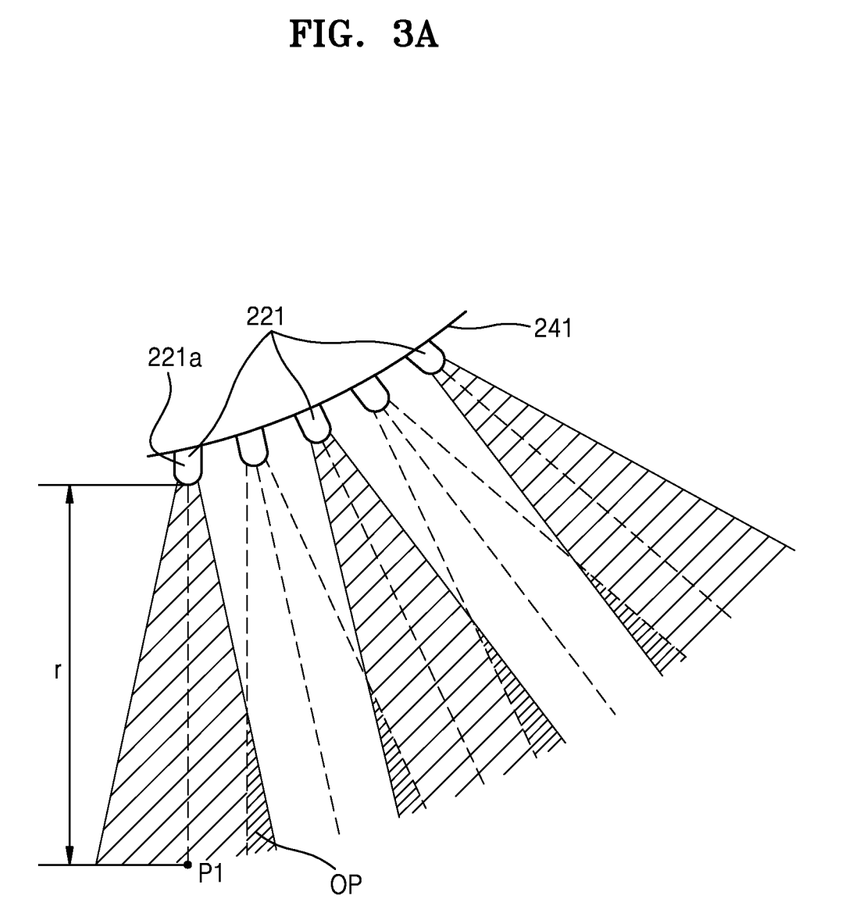
FIGS. 3A and 3B are conceptual diagrams illustrating paths of light emitted respectively from a first light emitter set and a second light emitter set, according to exemplary embodiments.
Figure 3B:
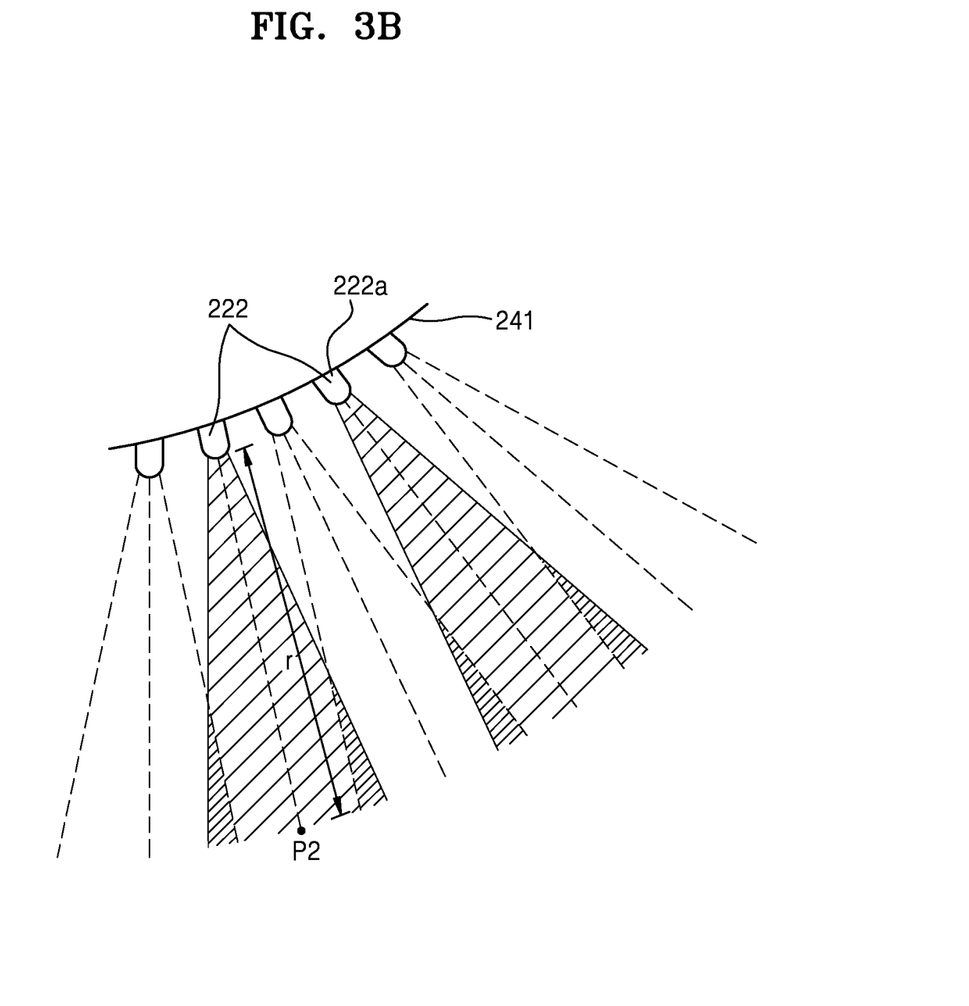

FIGS. 2A and 2B are a cross-sectional view and a plan view of a photographing apparatus 200 according to an exemplary embodiment, and FIGS. 3A and 3B are conceptual diagrams schematically showing paths of light emitted from a first light emitter set and a second light emitter set.

Referring to FIGS. 2A and 2B, the photographing apparatus 200 according to an exemplary embodiment includes a fish eye lens 210, a plurality of light emitters 220 arranged to be adjacent to the fish eye lens 210 and emitting light at different angles with respect to an optical axis of the fish eye lens 210, and an image sensor 230 receiving light emitted from the plurality of light emitters 220 and reflected by the objects 1 (see FIG. 1) and converting the light into electric signals. The fish eye lens 210 may be supported by a housing 240, and the plurality of light emitters 220 may be arranged on a radial surface 241 of the housing 240.

The housing 240 may include the radial surface 241, on which the plurality of light emitters 220 are arranged, and the image sensor 230 may be disposed in the housing 240.

Since the plurality of light emitters 220 are arranged on the radial surface 241, the plurality of light emitters 220 may emit light to different directions from one another. The plurality of light emitters 220 may be arranged in various directions based on the fish eye lens 210 that is supported by the housing 240 as shown in FIG. 2B, and the arrangement of the plurality of light emitters 220 may be regular or irregular.

The plurality of light emitters 220 are sequentially arranged away from a center of the fish eye lens 210, and as a light emitter 220 is disposed far from the center of the fish eye lens 210, an angle between the optical axis OA of the fish eye lens 210 and a direction in which light is emitted from the light emitter 220 becomes greater. The light emitted from the plurality of light emitters 220 may be transmitted to the plurality of objects 1 existing within the FOV range of the fish eye lens 210 and reflected by the objects 1, and then, passes through the fish eye lens 210 and is incident to the image sensor 230.

According to an exemplary embodiment, the plurality of light emitters 220 may include a first light emitter set 221 and a second light emitter set 222, and the first light emitter set 221 and the second light emitter set 222 may emit light sequentially.

Referring to FIGS. 3A and 3B, the plurality of light emitters 220 are arranged on the radial surface 241 of the housing 240, and the plurality of light emitters 220 may include the first light emitter unit 221 and the second light emitter unit 222 sequentially emitting the light. In addition, each of the first and second light emitter sets 221 and 222 may include a plurality of light emitters 221a and 222a. The plurality of light emitters 220 include first light emitters 221a and second light emitters 222a, and the first light emitters 221a may be grouped as a first light emitter set 221 and the second light emitters 222a may be grouped as a second light emitter set 222.

FIG. 3A schematically shows the light emitted from the first light emitter set 221 at a time point t1, and FIG. 3B schematically shows the light emitted from the second light emitter set 222 at another time point t2. The plurality of light emitters 221a and 222a included in the first and second light emitter sets 221 and 222 may have predetermined light divergent angles, respectively.

The light beams emitted from the plurality of light emitters 221a included in the first light emitter set 221 may not overlap with one another within a distance r to a point P1 of an object 1. Likewise, the light beams emitted from the plurality of light emitters 222a included in the second light emitter unit 222 may not overlap with one another within a distance r to a point P2 of the object 1. That is, the plurality of light beams emitted simultaneously may not overlap with one another within a predetermined distance.

According to the above configuration, the plurality of light beams that are incident on the image sensor 230 after being emitted at the time point t1 and reflected by the object 1 are not incident on a same point or area of the image sensor 230, and accordingly, depth information of the object 1 corresponding respectively to the plurality of light emitters 221a and 222a may be calculated accurately.

However, the light emitted from the first light emitter set 221 and the light emitted from the second light emitter set 222 may have an overlapping area OP with one another, and accordingly, there is no region that is not measured by the photographing apparatus 200.

Figure 4:
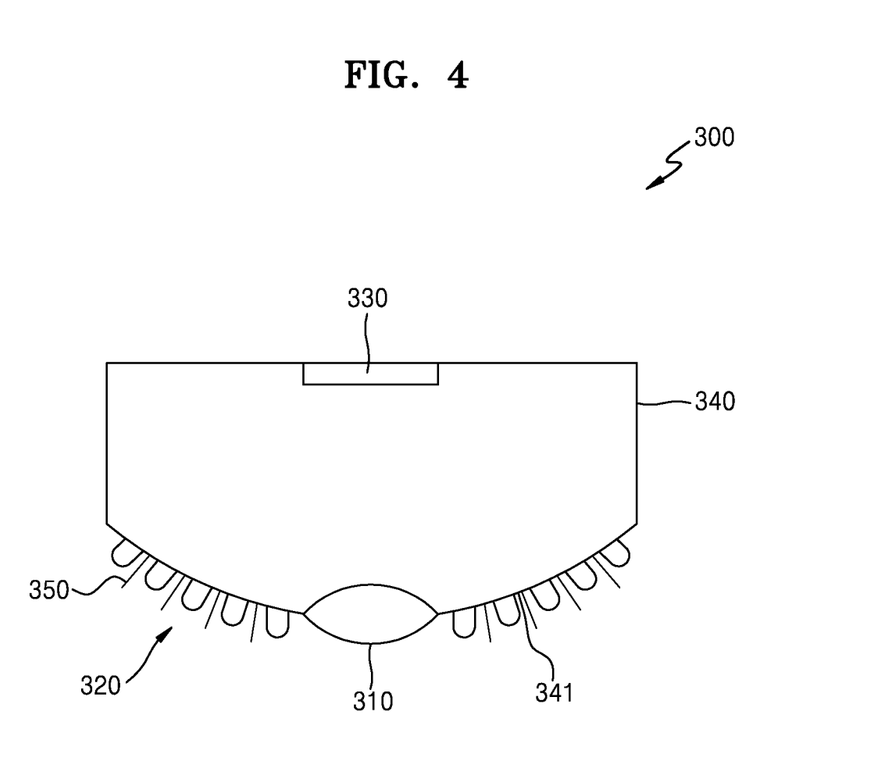
FIG. 4 is a schematic cross-sectional view of a photographing apparatus, according to an exemplary embodiment.

FIG. 4 is a schematic cross-sectional view of a photographing apparatus 300 according to an exemplary embodiment.

Referring to FIG. 4, the photographing apparatus 300 of an exemplary embodiment includes a fish eye lens 310, a plurality of light emitters 320 arranged to be adjacent to the fish eye lens 310 and emitting light at different angles with respect to an optical axis of the fish eye lens 310 from one another, and an image sensor 330 receiving the light that is emitted from the plurality of light emitters 320 and reflected by at least one object 1 (see FIG. 1) and converting the light into electric signals. The fish eye lens 310 may be supported by a housing 340, and the plurality of light emitters 320 may be arranged on a radial surface 341 of the housing 340.

The photographing apparatus 300 according to the present embodiment may include at least one shield 350 disposed between the plurality of light emitters 320 to block at least a portion of the light emitted from at least one of the plurality of light emitters 320.

As described above, the plurality of light beams emitted simultaneously may not overlap with one another. In addition, the plurality of light beams emitted from at a same time point and reflected by at least one object 1 may not be incident at a same point or area of the image sensor 330, and thus, depth information of the object 1 corresponding respectively to the plurality of light emitters 320 may be calculated accurately.

Each of the plurality of light emitters 320 has a predetermined light divergent angle, and accordingly, the light beams emitted from the light emitters 320 that are adjacent to one another may overlap with one another.

According to the present embodiment, the shield 350 for shielding at least a portion of the light emitted from at least one of the plurality of light emitters 320 may be disposed between the plurality of light emitters 320, and accordingly, undesired overlapping between the light beams may be prevented.

In FIG. 4, the shield 350 is disposed between all of the light emitters 320, but is not limited thereto. That is, the shield 350 may be only disposed between some of the light emitters 320.

As described above, the light beams emitted at the different time points may have overlapping regions with one another, and the shield 350 may be arranged appropriately taking account of the overlapping regions.

Figure 5:
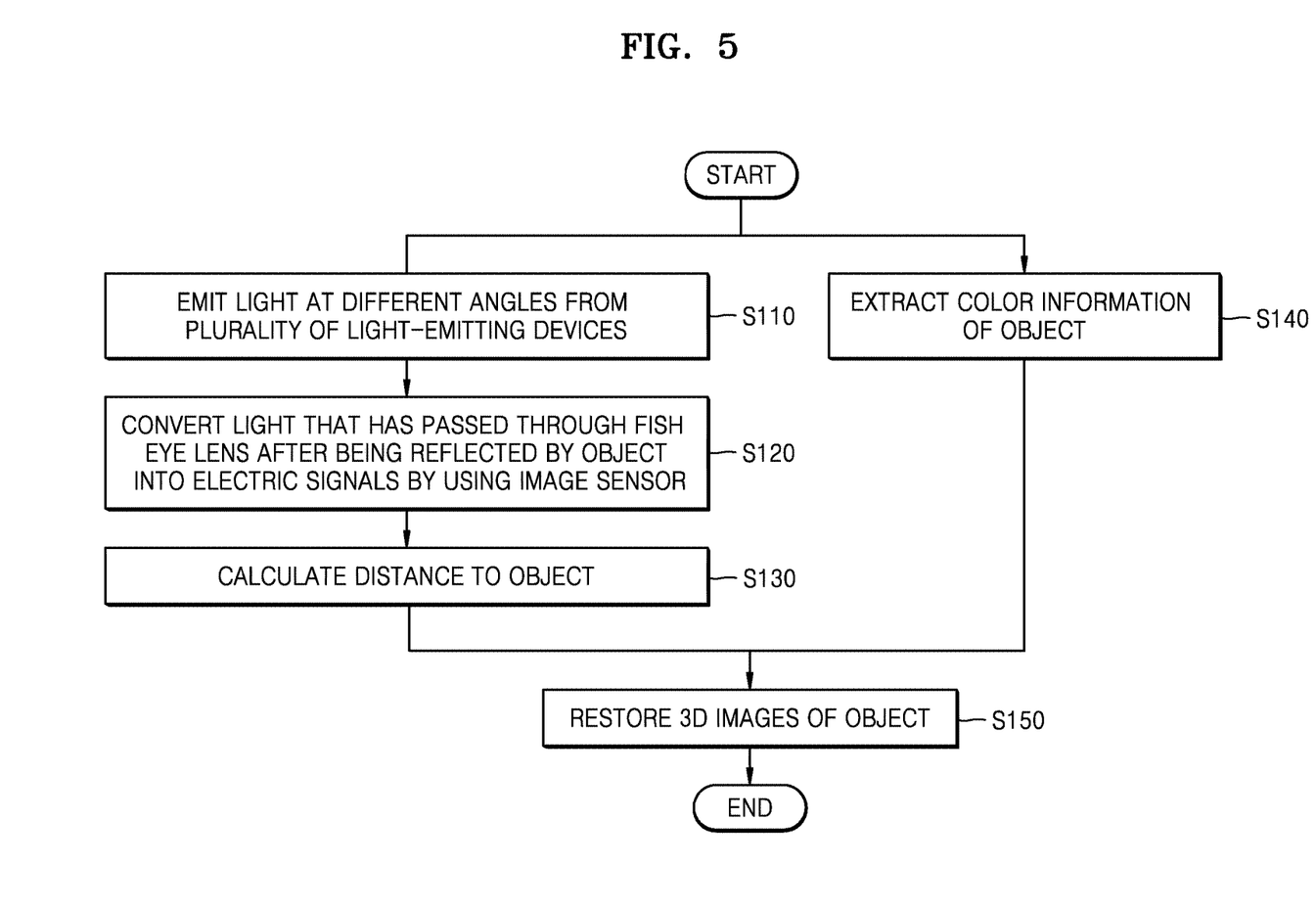
FIG. 5 is a flowchart illustrating a photographing method, according to an exemplary embodiment.

FIG. 5 is a flowchart of a photographing method according to an exemplary embodiment.

Referring to FIGS. 1 and 5, the photographing method according to an exemplary embodiment includes emitting light from the plurality of light emitters 120 at different angles from one another (S110), converting the light that passes through the fish eye lens 110 adjacent to the plurality of light emitters 120 after being emitted from the plurality of light emitters 120 and reflected by the object 1 into electric signals by using the image sensor 130 (S120), calculating distances to the object 1 based on the electric signals (S130), and generating 3D images of the object 1 based on the calculated distances to the object 1 (S150).

The plurality of light emitters 120 may emit light at different angles with respect to the optical axis OA of the fish eye lens 110 from one another in order to transmit the light to the plurality of objects 1 existing within the FOV range of the fish eye lens 110. Here, the light beams emitted from the plurality of light emitters 120 propagate in diverging directions from one another, and may be transmitted to the different objects 1.

According to an exemplary embodiment, the plurality of light emitters 120 are sequentially arranged away from a center of the fish eye lens 110. In addition, as a light emitter 120 is disposed far away from the center of the fish eye lens 110, an angle ($\theta 1$, $\theta 2$, $\theta 3$, and $\theta 4$) between the optical axis OA of the fish eye lens 110 and a direction in which the light is emitted from the light emitter 120 becomes greater.

The light beams emitted from the plurality of light emitters 120 may be reflected by a plurality of different objects 1 from one another and then may be incident one the image sensor 130. The distance from the photographing apparatus 100 to an object 1 may be measured by the TOF method. The TOF method is a method of calculating a distance by measuring a time period from a time when the light is irradiated to the object 1 to a time when the light is back after being reflected from the object 1, and through the TOF method, depth information about the object 1, that is, a 3D image of the object 1, may be obtained.

According to an exemplary embodiment, the light emitters 120 may emit infrared rays.

According to an exemplary embodiment, the fish eye lens 110 has the FOV of 180° or greater, and thus, the fish eye lens 110 may receive the light reflected from the object 1 that are arranged within a range of about 90° with respect to the optical axis OA. Therefore, the 3D images of the object 1, that is, depth information about the object 1, arranged throughout a wide area may be obtained at once.

The photographing method of the present embodiment may further include extracting color information about the object 1 from external visible light that is incident on the image sensor 130 through the fish eye lens 110 after being reflected from the object 1 (S140).

The external visible light may be natural light around the photographing apparatus 100, and the object 1 may reflect the external visible light around the object 1 to all directions. A portion of the external visible light reflected from the object 1 may pass through the fish lens 110 and may be incident on the image sensor 130, and accordingly, 2D images and color information about the object 1 may be extracted from the external visible light.

The color information may be combined with the 3D images obtained by using the plurality of light emitters 120, and then, the 3D images including colors may be restored.

Figure 6:
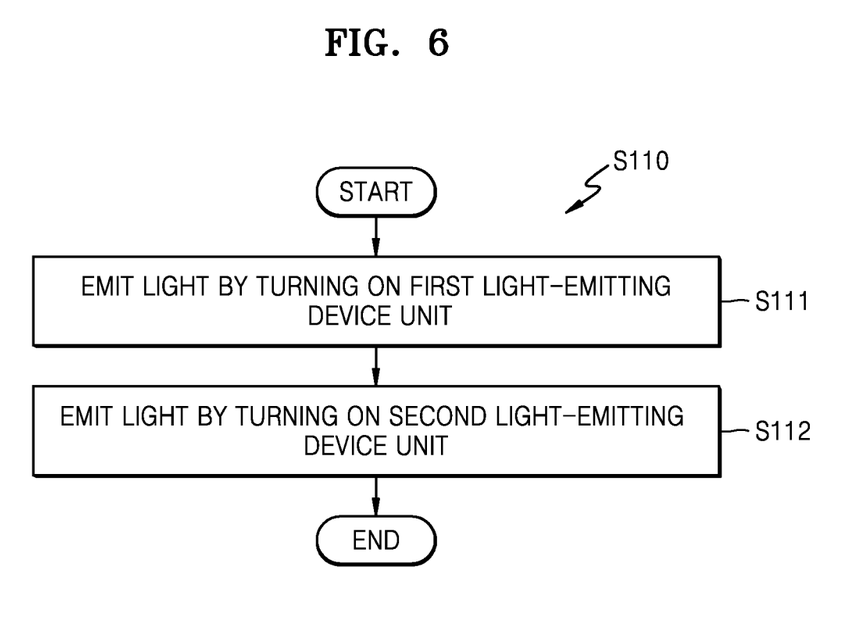
FIG. 6 is a flowchart illustrating operation S110 of FIG. 5 in more detail, according to an exemplary embodiment.

FIG. 6 is a flowchart illustrating operation S110 of FIG. 5 in detail.

Referring to FIG. 6, operation S110 of FIG. 5 may include emitting light by turning on the first light emitter set 221 (see FIG. 2A) (S111) and emitting light by turning on the second light emitter set 222 (see FIG. 2A) (S112).

Referring back to FIGS. 2A, 3A and 3B, the plurality of light emitters 220 included in the photographing apparatus 200 according to the exemplary embodiment may include the first light emitter set 221 and the second light emitter set 222, and the first and second light emitter sets 221 and 222 may sequentially emit light.

The light beams emitted from the plurality of light emitters 221a included in the first light emitter set 221 may not overlap with one another within a distance r to a point P1 of an object 1. Likewise, the light beams emitted from the plurality of light emitters 222a included in the second light emitter set 222 may not overlap with one another within a distance r to a point P2. That is, the plurality of light beams emitted simultaneously may not overlap with each other within a predetermined distance.

According to the above configuration, the plurality of light beams that are incident on the image sensor 230 after being emitted at the time point t1 and reflected by the object 1 are not incident on a same point or area of the image sensor 230, and accordingly, depth information of the object 1 corresponding respectively to the plurality of light emitters 221a and 222a may be calculated accurately.

However, the light emitted from the first light emitter unit 221 and the light emitted from the second light emitter unit 222 may have an overlapping area OP with one another, and accordingly, there is no region that is not covered by the photographing apparatus 200.

As described above, 3D images of objects in a wide area may be measured and obtained at once using the photographing apparatus and method according to the present exemplary embodiments.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A photographing apparatus comprising:
    a fish eye lens;
    a plurality of light emitters disposed around the fish eye lens and configured to emit light at different angles with respect to an optical axis of the fish eye lens; and
    an image sensor configured to receive the light emitted from the plurality of light emitters and reflected by at least one object, and convert the light into an electric signal, wherein the plurality of light emitters comprise a plurality of first light emitters and a plurality of second light emitters,
    wherein the first light emitters are configured to simultaneously emit first light at a first time point, and the second light emitters are configured to simultaneously emit second light at a second time point which is different from the first time point, and
    wherein the first light emitters and second light emitters are arranged in alternating concentric rings and are disposed such that the first light emitted from one of the first light emitters does not overlap the first light emitted from an adjacent one of the first light emitters within a predetermined distance from the one of the first light emitters toward an object to which the first light is transmitted, where the predetermined distance is a distance to a point on the object.

2. The photographing apparatus of claim 1, wherein the plurality of light emitters are disposed around the fish eye lens such that the farther a light emitter is disposed from a center of the fish eye lens, the greater is an angle between the optical axis of the fish eye lens and a direction in which the light is emitted from the light emitter.

3. The photographing apparatus of claim 1, further comprising a housing supporting the fish eye lens,
    wherein the plurality of light emitters are disposed on a radial surface of the housing.

4. The photographing apparatus of claim 3, wherein the image sensor is disposed in the housing.

5. The photographing apparatus of claim 1, wherein the fish eye lens has a field of view (FOV) of 180° or greater.

6. The photographing apparatus of claim 1, wherein the light comprises infrared light.

7. The photographing apparatus of claim 1, wherein the first and second light emitters are disposed such that the first light emitted from the one of the first light emitters has a region overlapping the second light emitted from one of the second light emitters which is adjacent to the one of the first light emitters, within the predetermined distance.

8. The photographing apparatus of claim 1, further comprising at least one shield disposed between the plurality of light emitters and configured to prevent overlapping between the light emitted from at least one of the plurality of light emitters disposed at one side of the shield and the light emitted from another at least one of the plurality of light emitters disposed at the other side of the shield.

9. A photographing method comprising:
    controlling a plurality of light emitters to emit light at different angles from one another with respect to an optical axis of a fish eye lens disposed inside the plurality of light emitters;
    converting the light that has been emitted from the plurality of light emitters, reflected by at least one object, and has passed through the fish eye lens, into an electric signal by using an image sensor;
    calculating distances to the object from the plurality of light emitters based on the electric signal; and
    generating a three-dimensional (3D) image of the object based on the distances to the object,
    wherein the plurality of light emitters comprise a plurality of first light emitters and a plurality of second light emitters,
    wherein the plurality of first light emitters are arranged in a first group of concentric rings and the plurality of second light emitters are arranged in a second group of concentric rings such that the first concentric rings alternate with the second concentric rings, and
    wherein the controlling the plurality of light emitters to emit the light comprises:
        controlling the first light emitters to simultaneously emit first light at a first time point;
        controlling the second light emitters to simultaneously emit second light at a second time point which is different from the first time point; and
        controlling the first light emitters such that the first light emitted from one of the first light emitters does not overlap the first light emitted from an adjacent one of the first light emitters within a predetermined distance from the one of the first light emitters toward an object to which the first light is transmitted, where the predetermined distance is a distance to a point on the object.

10. The photographing method of claim 9, wherein the plurality of light emitters are disposed around the fish eye lens such that the farther a light emitter is disposed from a center of the fish eye lens, the greater is an angle between the optical axis of the fish eye lens and a direction in which the light is emitted from the light emitter.

11. The photographing method of claim 9, wherein the fish eye lens has a field of view (FOV) of 180° or greater.

12. The photographing method of claim 9, wherein the light comprises infrared light.

13. The photographing method of claim 9, wherein the controlling the plurality of light emitters to emit the light further comprises controlling the first light emitters and/or the second light emitters such that the first light emitted from the one of the first light emitters has a region overlapping the second light emitted from one of the second light emitters which is adjacent to the one of the first light emitters, within the predetermined distance.

14. The photographing method of claim 9, further comprising extracting color information about the object from external visible light that is incident on the image sensor through the fish eye lens after being reflected from the object.

15. A photographing apparatus comprising:
    a fish eye lens;
    a plurality of light emitters disposed around the fish eye lens in a series of concentric rings and configured to emit light at different angles with respect to an optical axis of the fish eye lens, wherein the plurality of light emitters comprise a plurality of first light emitters and a plurality of second light emitters; and an image sensor configured to receive the light emitted from the plurality of light emitters and reflected by at least one object, and convert the light into an electric signal wherein the first light emitters are configured to simultaneously emit first light at a first time point, and the second light emitters are configured to simultaneously emit second light at a second time point which is different from the first time point, and wherein the first and second light emitters are disposed such that each first light emitter is immediately neighbored by only second light emitters, and each second light emitter is immediately neighbored by only first light emitters, wherein the first light emitted from one of the first light emitters does not overlap the first light emitted from an adjacent one of the first light emitters within a predetermined distance from the one of the first light emitters toward an object to which the first light is transmitted.

16. The photographing apparatus of claim 15, wherein the plurality of light emitters are disposed around the fish eye lens such that the farther a light emitter is disposed from a center of the fish eye lens, the greater is an angle between the optical axis of the fish eye lens and a direction in which the light is emitted from the light emitter.

17. The photographing apparatus of claim 15, wherein the light comprises infrared light.

18. The photographing apparatus of claim 15, wherein the first and second light emitters are disposed such that the first light emitted from the one of the first light emitters has a region overlapping the second light emitted from one of the second light emitters which is adjacent to the one of the first light emitters, within the predetermined distance.

19. The photographing apparatus of claim 15, further comprising at least one shield disposed between the plurality of light emitters and configured to prevent overlapping between the light emitted from at least one of the plurality of light emitters disposed at one side of the shield and the light emitted from another at least one of the plurality of light emitters disposed at the other side of the shield.

20. A photographing apparatus comprising:
a fish eye lens;
a plurality of light emitters disposed around the fish eye lens and configured to emit light at different angles with respect to an optical axis of the fish eye lens, wherein the plurality of light emitters comprise a plurality of first light emitters and a plurality of second light emitters,
wherein the plurality of first light emitters are arranged in a first group of concentric rings and the plurality of second light emitters are arranged in a second group of concentric rings such that the first concentric rings alternate with the second concentric rings;
a housing supporting the fish eye lens and including a convex surface around the fish eye lens; and
an image sensor configured to receive the light emitted from the plurality of light emitters and reflected by at least one object, and convert the light into an electric signal, wherein the plurality of light emitters are disposed on the convex surface of the housing.

* * * * *